United States Patent
Kwon (10) Patent No.: US 8,102,373 B2
(45) Date of Patent: Jan. 24, 2012

(54) HYBRID DEVICE TO MEDIATE PRIORITY OF A TASK-HANDLER AND USER INTERFACE METHOD THEREOF

(75) Inventor: Seong-ho Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1796 days.

(21) Appl. No.: 10/829,396

(22) Filed: Apr. 22, 2004

(65) Prior Publication Data

US 2004/0246823 A1 Dec. 9, 2004

(30) Foreign Application Priority Data

Apr. 23, 2003 (KR) ........................ 10-2003-0025711

(51) Int. Cl.
*G06F 9/46* (2006.01)
*G06F 3/02* (2006.01)
*G06F 3/00* (2006.01)
*G06F 3/048* (2006.01)
*H04N 7/14* (2006.01)

(52) U.S. Cl. ........ 345/169; 345/172; 715/716; 715/728; 715/810; 348/14.04; 348/14.05; 718/103

(58) Field of Classification Search .............. 718/1, 100, 718/101, 102, 103, 104, 105; 715/810, 835, 715/839; 345/169, 173, 170, 168, 172; 340/825.69, 340/825.72, 825.22

See application file for complete search history.

(56) References Cited

U.S. PATENT DOCUMENTS

| | | | | |
|---|---|---|---|---|
| 5,274,816 A * | 12/1993 | Oka | ........ | 713/2 |
| 5,497,455 A * | 3/1996 | Suga et al. | ........ | 715/835 |
| 5,691,778 A * | 11/1997 | Song | ........ | 725/59 |
| 5,854,624 A * | 12/1998 | Grant | ........ | 345/169 |
| 5,867,729 A * | 2/1999 | Swonk | ........ | 710/8 |
| 6,345,143 B2 * | 2/2002 | Kanda | ........ | 386/52 |
| 6,633,281 B2 * | 10/2003 | Lin et al. | ........ | 345/173 |
| 6,760,537 B2 * | 7/2004 | Mankovitz | ........ | 386/83 |
| 6,829,512 B2 * | 12/2004 | Huang et al. | ........ | 700/65 |
| 7,170,422 B2 * | 1/2007 | Nelson et al. | ........ | 340/825.72 |
| 2001/0027500 A1 * | 10/2001 | Matsunaga | ........ | 710/104 |
| 2002/0005435 A1 * | 1/2002 | Cottrell | ........ | 236/46 R |
| 2002/0031328 A1 * | 3/2002 | Watanabe et al. | ........ | 386/46 |
| 2002/0060816 A1 * | 5/2002 | Dow et al. | ........ | 358/302 |
| 2003/0067886 A1 * | 4/2003 | Son et al. | ........ | 370/260 |
| 2004/0230636 A1 * | 11/2004 | Masuoka et al. | ........ | 708/800 |
| 2005/0251829 A1 * | 11/2005 | Kondo et al. | ........ | 725/55 |

FOREIGN PATENT DOCUMENTS

JP 08-065766 3/1996
KR 2000-39179 7/2000

* cited by examiner

*Primary Examiner* — Meng An
*Assistant Examiner* — Abdullah Al Kawsar
(74) *Attorney, Agent, or Firm* — NSIP Law (57) ABSTRACT

A hybrid device having a plurality of task-handlers corresponding to a function key uses a user interface method. The user interface method includes receiving information necessary to change priorities of the task-handlers corresponding to the function key; changing the priorities of the task-handlers based on the received information; and storing information regarding the changed priorities according to a predetermined application type.

22 Claims, 6 Drawing Sheets

HYBRID DEVICE TO MEDIATE PRIORITY OF A TASK-HANDLER AND USER INTERFACE METHOD THEREOF

CROSS-REFERENCE TO RELATED APPLICATIONS

This application claims the priority of Korean Patent Application No. 2003-25711, filed on Apr. 23, 2003, in the Korean Intellectual Property Office, the disclosure of which is incorporated herein in its entirety by reference.

BACKGROUND OF THE INVENTION

1. Field of the Invention

The present invention relates to a hybrid device to mediate priorities of a plurality of task-handlers corresponding to a function key and a user interface method thereof.

2. Description of the Related Art

Hybrid devices are generally referred to as multimedia devices which simultaneously perform multiple functions, including reproduction from and recording to a digital versatile disc (DVD), reproduction of titles from a hard disc drive (HDD), recording to the HDD, reproduction from a compact disc (CD), and reproduction from a mini disc (MD).

Generally, according to a DVD recorder performing simple functions, function keys, such as "PLAY", "RECORD", "STOP", "PAUSE", "FAST FORWARD SCAN", and "REWIND SCAN", are provided on a remote controller or a front panel of the DVD recorder. Task-handlers are provided to correspond to the function keys on a one-to-one basis to perform functions selected by a user. Here, the task-handlers indicate programs, which control the DVD recorder to perform the selected functions. However, according to a hybrid device which has emerged with the rapid development of hardware and the generalization of real-time operating systems, a plurality of task-handlers correspond to a common function key input via a remote controller or a front panel on a one-to-multiple basis.

For example, when data is recorded to a HDD and a DVD-random access memory (RAM) via two channels as well as reproducing titles from the HDD, a HDD recording task handler, a DVD-RAM recording task handler, and a HDD reproduction task handler are separately executed. When a user presses a "STOP" key in this situation, a problem exists in determining which one of the HDD recording task handler, the DVD-RAM recording task handler, and the HDD reproduction task handler stops first.

For example, when the "STOP" key is pressed in a conventional device, the priority of HDD reproduction task is handled first, and the HDD reproduction task handler stops first. Thus, when the user desires to stop recording to the HDD or the DVD-RAM without stopping reproduction from the HDD, the conventional device cannot be controlled to meet the user's request. In other words, in a case where priorities of task-handlers are fixed in the hybrid device, the user cannot control the device according to desired priorities of the task-handlers. Therefore, it is difficult for the user to flexibly and conveniently control the device.

Further, adding function keys to the remote controller and/or the front panel to meet the user's requests is costly and compromises the compactness of the hybrid device. This is also disadvantageous to the convenience and unity afforded by the hybrid device.

These problems have came to light due to an increase in the number of simultaneous tasks performed with the development of the hybrid device.

SUMMARY OF THE INVENTION

An aspect of the present invention provides a hybrid device to flexibly and conveniently mediate priorities of a plurality of task-handlers corresponding to a common input function key and a user interface method thereof.

According to an aspect of the present invention, a user interface method performed via a hybrid device having a plurality of task-handlers corresponding to a function key comprises: receiving information necessary to change priorities of the task-handlers corresponding to the function key; changing the priorities of the task-handlers based on the received information; and storing information regarding the changed priorities according to a predetermined application type.

Additional aspects and/or advantages of the invention will be set forth in part in the description which follows and, in part, will be obvious from the description, or may be learned by practice of the invention.

According to an aspect of the present invention, the receiving of the information necessary to change the priorities of the task-handlers comprises: receiving a request to change priorities of the task-handlers from a user; receiving information regarding the function key selected to change priorities of the task-handlers; and receiving information to change the priorities of the function key.

According to an aspect of the present invention, the storing of information regarding the changed priorities according to the predetermined application type comprises: receiving information regarding the selected predetermined application type; and storing the information regarding the changed priorities according to the selected application type.

According to an aspect of the present invention, the receiving the information regarding the selected predetermined application type comprises: receiving information regarding whether the changed priorities are applied once, permanently, or set by default.

According to another aspect of the present invention, a hybrid device having a plurality of task-handlers corresponding to a function key comprises: a display to display information necessary to change priorities of the task-handlers; an input unit to receive the information necessary to change priorities; a priority changer to change the priorities of the task-handlers based on the received information; and a memory to store information regarding the changed priorities of the task-handlers according to an application type.

According to an aspect of the present invention, the display unit displays a menu to select a function key in response to a request to change the priorities, a menu to change priorities for the selected function key, a priority change result, and a menu to select the application type.

According to an aspect of the present invention, the input unit receives the request to change the priorities of the task-handlers, information regarding the selected function key, the changed priorities, and the application type, and then provides the request to change the priorities and the information to the priority changer.

The function key includes one or more of a "PLAY" key, a "RECORD" key, a "STOP" key, a "PAUSE" key, a "FAST FORWARD SCAN" key, and a "REWIND SCAN" key.

According to an aspect of the present invention, the priority changer changes the priorities of task-handlers corresponding to the selected function key based on the request to change the priorities of the task-handlers, the information regarding the selected function key, and the changed priorities.

According to an aspect of the present invention, the priority changer implements and changes the priorities of the task-handlers using a linked-list.

According to an aspect of the present invention, the memory stores the information regarding the changed priorities according to the information regarding the selected application type.

According to an aspect of the present invention, the memory also stores information including whether the changed priorities are applied once, permanently, or set by default.

BRIEF DESCRIPTION OF THE DRAWINGS

The above and/or other aspects and advantages of the invention will become more apparent, and more readily appreciated from the following description of the embodiments, taken in conjunction with the attached drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout.

Figure 1:
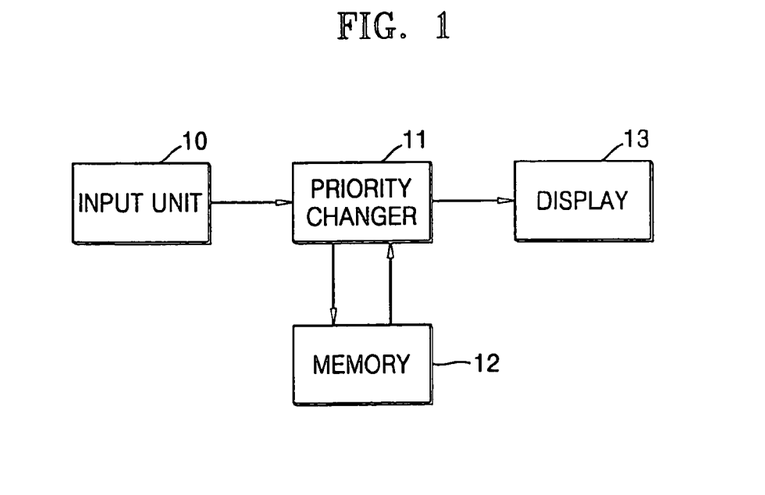
FIG. 1 is a block diagram of a hybrid device according to an aspect of the present invention.

FIG. 1 is a block diagram of a hybrid device according to an aspect of the present invention. Referring to FIG. 1, the hybrid device includes an input unit 10, a priority changer 11, a memory 12, and a display 13. The display 13 displays a menu to receive information from a user to change priorities of task-handlers. In other words, when a request to change the priorities is input from the user, the display 13 displays a menu to select a function key, a menu to change the priorities, the change result of the priorities, and a menu to select an application type for the changed priorities.

The input unit 10 receives the information and provides the information to the priority changer 11. In other words, the input unit 10 receives the request to change the priorities and information regarding the selected function key, the changed priorities, and the selected application type and provides the same to the priority changer 11. Here, the function key may be a "PLAY" key, a "RECORD" key, a "STOP" key, a "PAUSE" key, a "FAST FORWARD SCAN" key, or a "REWIND SCAN" key.

The priority changer 11 changes priorities of the task-handlers based on the information provided by the input unit 10. In other words, the priority changer 11 changes priorities of the task-handlers corresponding to the selected function key based on the request to change the priorities, the information regarding the selected function key, and the changed priorities. According to an aspect of the present invention, a linked-list is used as a data structure to implement the priorities of the task-handlers.

The memory 12 stores information regarding the changed priorities according to the information regarding the selected application type. According to an aspect of the present invention, the user is able to determine whether to apply the changed priorities, once, permanently, or set as default.

FIGS. 2A through 2E are views to explain a user interface method according to an aspect of the present invention. Accordingly, suppose a hybrid device records data to a HDD and a DVD-RAM via two channels and reproduces titles from the HDD. In addition, suppose a HDD recording task-handler, a DVD-RAM recording task-handler, and a HDD reproduction task-handler are being executed via the hybrid device. A user interface method to mediate priorities of the task-handlers, for example, to stop the HDD recording task-handler, the DVD-RAM recording task-handler, and the HDD reproduction task-handler when a user presses a "STOP" key is described below.

Figure 2A:
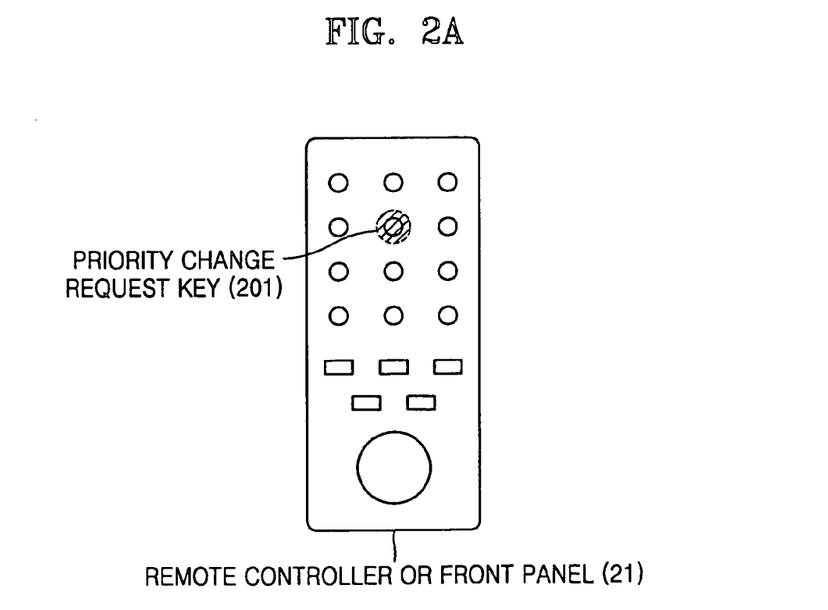
FIGS. 2A through 2E are views to explain a user interface method of the hybrid device according to an aspect of the present invention.

Referring to FIG. 2A, the hybrid device includes an input unit 21 such as a remote controller or a front panel. The input unit 21 includes a priority change request key 201. When the user desires to change priorities of task-handlers corresponding to a predetermined function key, the user presses the priority change request key 201. The hybrid device then receives a request to change the priorities of the task-handlers from the user.

Figure 2B:
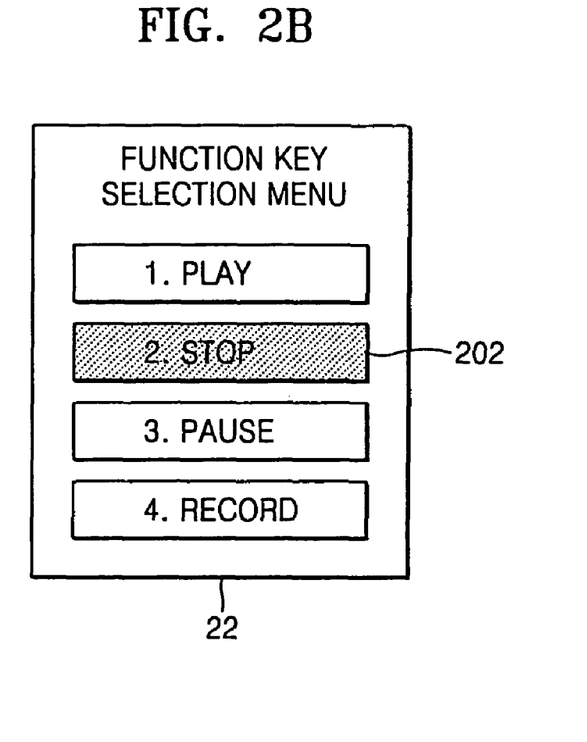

Referring to FIG. 2B, the hybrid device displays a function key selection menu 22 on the display 13 in response to the request to change the priorities of the task-handlers. The user then selects a function key to change the priorities of the task-handlers. According to an aspect of the present invention, the function key selection menu 22 displays a "PLAY" key, a "STOP" key, a "PAUSE" key, and a "RECORD" key, which may be selected by the user. For example, when the user selects the "STOP" key 202, information regarding the selected function key is provided to the priority changer 11 via the input unit 21.

Figure 2C:
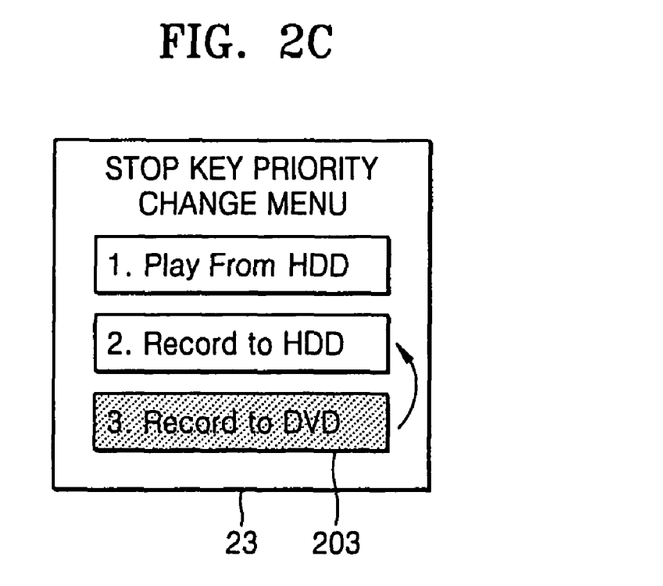

Referring to FIG. 2C, the hybrid device displays a priority change menu 23 corresponding to the "STOP" key 202. Here, since a plurality of task-handlers corresponding to the "STOP" key 202 are displayed, the user is able select one of the task-handlers, priority of which is to be changed. For example, as shown in FIG. 2C, "Play from HDD", "Record to HDD", and "Record to DVD" are displayed as the task-handlers corresponding to the "STOP" key 202 according to their current priorities. Here, the hybrid device receives priority change information 203 regarding change of priority of the task-handlers from the user. In other words, when the user desires to change the third priority "Record to DVD" to second priority, the user selects the corresponding task-handler to move the same to a desired priority display position. Here, the priority change information 203 is provided to the priority changer 11.

Figure 2D:
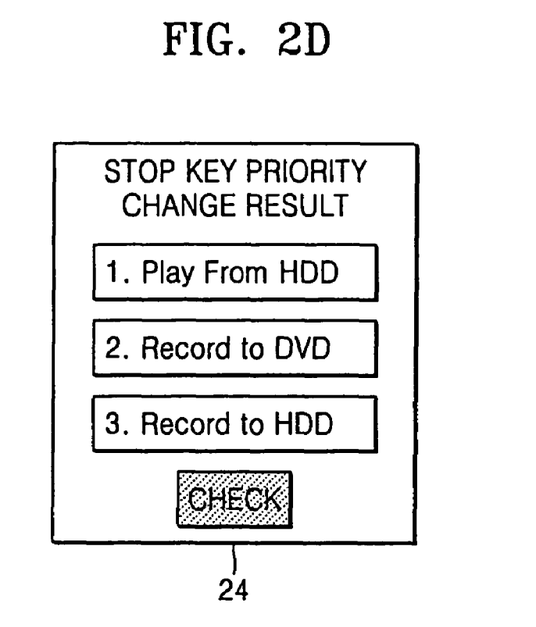

Referring to FIG. 2D, the hybrid device changes the priority of the selected task-handler based on the priority change information 203 and displays the change result on a priority change result menu 24. As shown in FIG. 2D, task-handler "Record to DVD" selected by the user holds the second position.

Figure 2E:
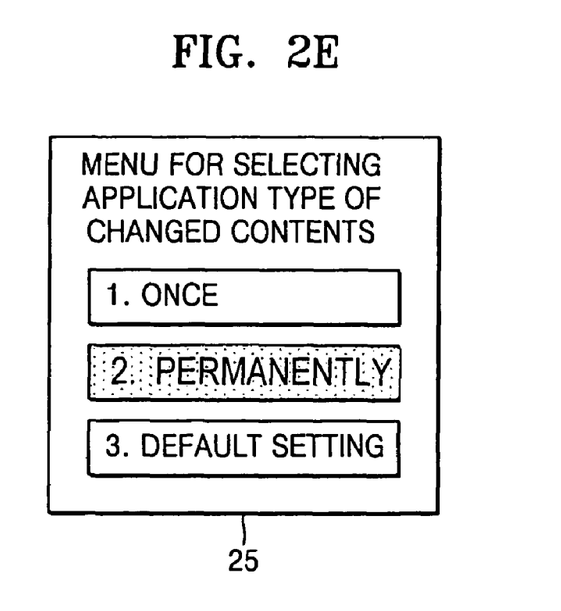
Figure 3A:
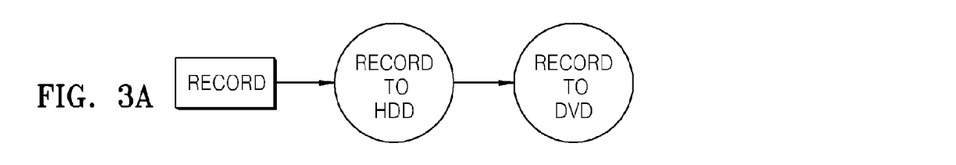
FIGS. 3A through 3D are views to show a data structure including priority information according to an aspect of the present invention.
Figure 3B:
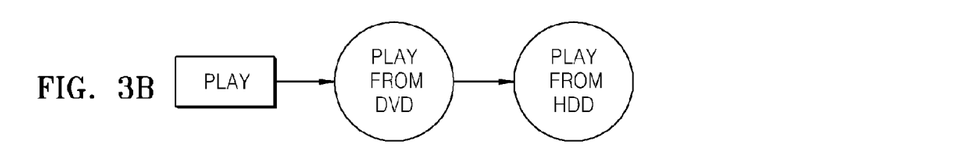
Figure 3C:
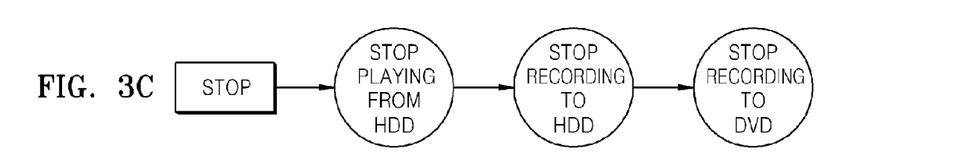
Figure 3D:
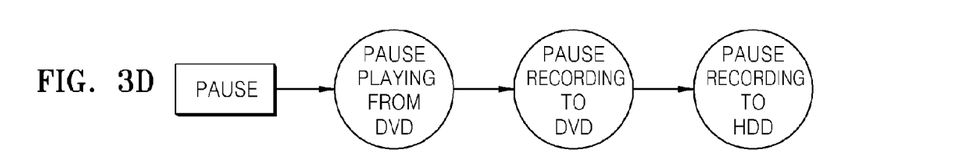

Referring to FIG. 2E, the hybrid device displays a changed content application type selection menu 25 to allow the user to determine the application of the changed priority to the hybrid device. Accordingly, the changed priority may be applied to the hybrid device once, permanently, or may be set by default. The memory 12 stores information regarding the changed priority according to the application type selected by the user. In more detail, when the user determines to apply the changed priority to the hybrid device once, the information regarding the changed priority is stored in a temporary memory. Thus, the function key operates only once according to the changed priority and returns to initial priority stored in the memory 12. As a result, information regarding the priority stored in the memory 12 is not changed. When the user determines to permanently apply the changed priority to the hybrid device, the information regarding the changed priority is stored in the memory 12. As a result, the function key operates according to permanently changed priority. When the user determines to set the changed priority by default, information regarding initially set priority is stored in the memory 12 regardless of the information regarding the changed priority. As a result, the function key operates according to the initially set priority.

FIGS. 3A through 3D are views to show a data structure including priority information according to an aspect of the present invention. Referring to FIGS. 3A through 3D, task-handlers corresponding to function keys are implemented in a form of a linked-list. For example, a "STOP" function key is implemented in the order of a linked-list of "stop playing from HDD", "stop recording to HDD", and "stop recording to DVD". Thus, according to an aspect of the present invention, when priorities are changed as described in relation to FIGS. 2A through 2E, the linked-list of the "STOP" function key is changed into the order of "stop playing from HDD", "stop recording to DVD", and "stop recording to HDD".

Figure 4:
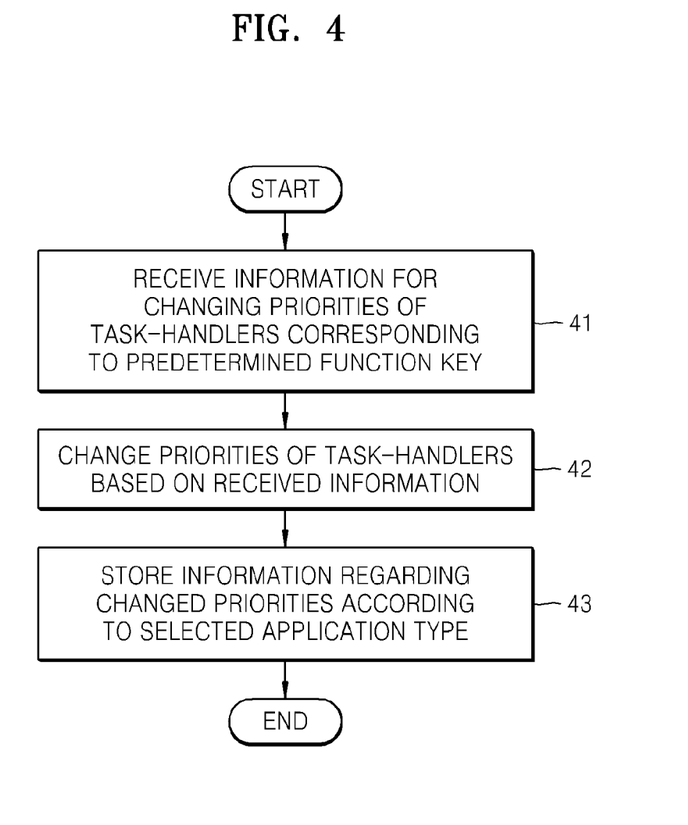
FIG. 4 is a flowchart to explain a user interface method of the hybrid device according to an aspect of the present invention.

FIG. 4 is a flowchart to explain a user interface method according to the present invention. Referring to FIG. 4, in operation 41, a hybrid device receives information necessary to change priorities of task-handlers corresponding to a predetermined function key. In operation 42, the hybrid device changes the priorities of the task-handlers based on the received information. In operation 43, the hybrid device stores information regarding the changed priorities according to an application type selected by a user.

According to an aspect of the present invention, the information necessary to change the priorities includes a request to change priorities, information regarding a selected function key, and changed priorities. According to an aspect of the present invention, application type selection information includes selection information regarding whether the changed priorities are applied to the hybrid device once, permanently, or set by default.

Figure 5:
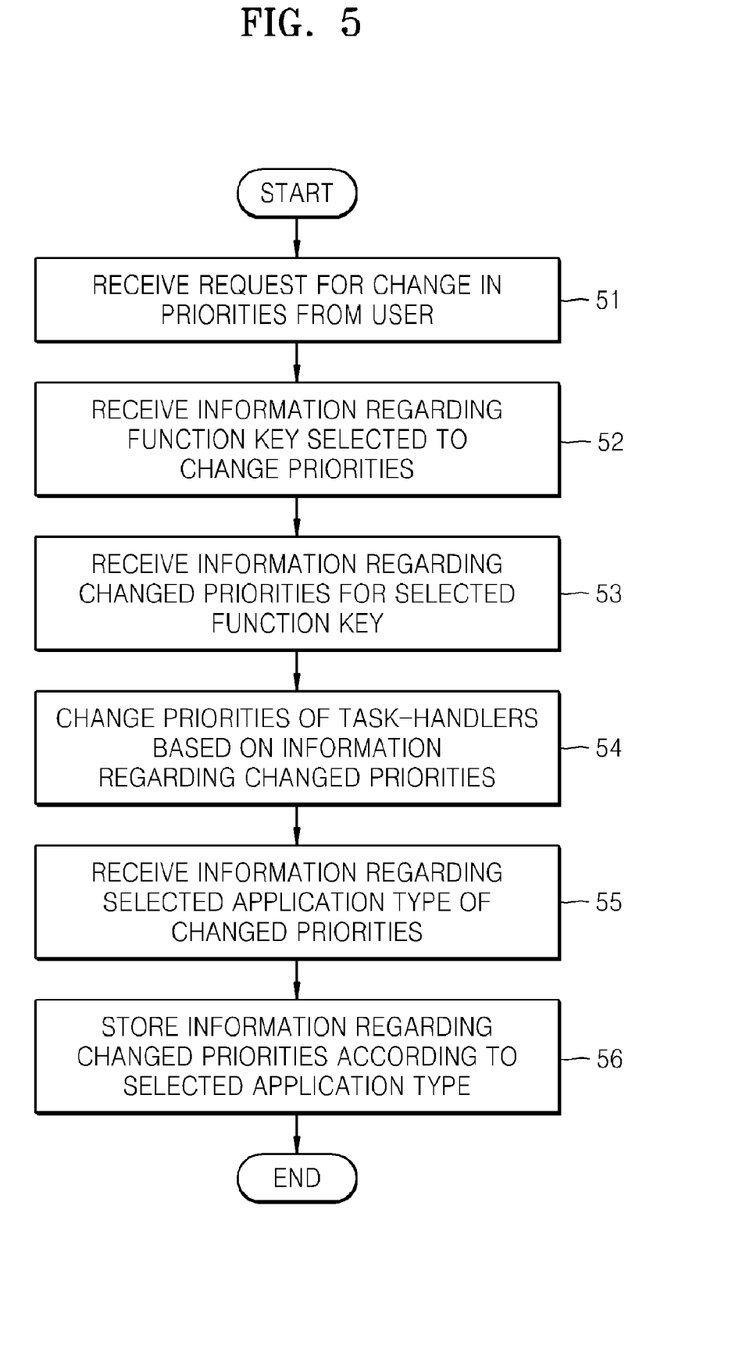
FIG. 5 is a flowchart to explain the user interface method of the hybrid device according to an aspect of the present invention.

FIG. 5 is a flowchart to explain the user interface method in detail. Referring to FIG. 5, in operation 51, the hybrid device receives the request to change the priorities from the user. In operation 52, the hybrid device displays a menu to select a function key shown on the display 13 and receives information regarding a function key selected to change priority thereof.

In operation 53, the hybrid device displays current priorities of a plurality of task-handlers corresponding to the selected function key via a priority change menu and receives information regarding the changed priorities. In operation 54, the hybrid device changes the priorities of the task-handlers based on the received information regarding changed priorities. According to an aspect of the invention, a linked-list is used as a data structure to implement the priorities of the task-handlers.

In operation 55, the hybrid device receives information regarding an application type selected to apply the changed priorities. In operation 56, the hybrid device stores the information regarding the changed priorities according to the selected application type. In other words, as previously described in relation to FIGS. 2A through 2E, the hybrid device determines whether to apply the changed priorities thereto once, permanently, or set the changed priorities by default.

While not required, it is understood that the method of FIGS. 4 and 5 can be implemented as software encoded on a computer-readable recording medium, readable by a general or special purpose computer. An aspect of the invention includes a computer-readable medium having a program enabling a computer to change priorities of task-handlers, comprising: receiving a request from a user to change priorities of the task-handlers; and changing priorities of the task-handlers, based on the received information. Moreover, it is understood that the hybrid device can additionally handle reading/reproducing with respect to other media, such as Blu-ray discs, advanced optical discs, E-DVD, and magneto-optical media.

As described above, in a hybrid device according to an aspect of the present invention, priorities of task-handlers corresponding to each of function keys is set. Thus, a user interface method to conveniently and flexibly mediate the priorities of the task-handlers is provided to the hybrid device. Further, multiple keys to convert into a DVD, a HDD, a CD, or a MD are not necessary. Moreover, a priority change request key to change the priorities of task-handlers corresponding to a selected function key replaces multiple keys for conversion. As a result, the number of necessary function keys on a remote controller or a front panel is decreased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A user interface method of a hybrid device, the hybrid device including a plurality of task-handlers corresponding to a common function key of an input unit, the task-handlers being controlled by operation of the common function key of the input unit, the user interface method comprising:
   receiving information to change priorities of the task-handlers from the input unit by a user to the hybrid device;
   changing the priorities of the task-handlers in the hybrid device, based on the received information; and
   storing information regarding the changed priorities in the hybrid device according to an application type indicating whether the changed priorities are to be applied once, are to be applied permanently, or are to be set to a default setting,
   wherein:
      the hybrid device is configured to simultaneously perform a plurality of recording and/or reproducing functions by simultaneously recording data to and/or reproducing data from at least one non-transitory information storage medium;
      each of the task-handlers of the hybrid device controlled by the operation of the common function key controls a different one of the plurality of recording and/or reproducing functions of the hybrid device; and
      the priorities of the task-handlers of the hybrid device relate to an order in which the task-handlers are individually and selectively controlled by the operation of the common function key.

2. The user interface method according to claim 1, wherein the receiving of the information to change the priorities of the task-handlers comprises receiving from the user, via the input unit:
a request to change the priorities of the task-handlers from the user;
information regarding the common function key selected to change priorities of the task-handlers; and
information to change the priorities of the common function key.

3. The user interface method according to claim 1, wherein the storing of information regarding the changed priorities comprises:
receiving information regarding the application type, using the hybrid device; and
storing the information regarding the changed priorities in the hybrid device, according to the application type.

4. The user interface method according to claim 3, wherein the information regarding the application type includes information indicating whether the changed priorities are to be applied once, are to be applied permanently, or are to be set to a default setting.

5. The user interface method according to claim 1, wherein the input unit is a front panel of the hybrid device or a remote controller of the hybrid device; and the task-handlers are not part of the input unit.

6. A hybrid device comprising:
a plurality of task-handlers corresponding to a common function and being controlled by operation of a common function key;
a display to display information to change priorities of the task-handlers;
an input unit comprising the common function key, to input the information to change the priorities of the task-handlers by a user to the hybrid device;
a priority changer to change the priorities of the task-handlers, based on the input information; and
a memory to store information regarding the changed priorities of the task-handlers, according to an application type indicating whether the changed priorities are to be applied once, are to be applied permanently, or are to be set to a default setting,
wherein:
the hybrid device is configured to simultaneously perform a plurality of recording and/or reproducing functions by simultaneously recording data to and/or reproducing data from at least one non-transitory information storage medium;
each of the task-handlers of the hybrid device controlled by the operation of the common function key controls a different one of the plurality of recording and/or reproducing functions of the hybrid device; and
the operation of each of the task-handlers of the hybrid device is selectively and individually controlled by the operation of the common function key, according to the priorities of the task-handlers.

7. The hybrid device according to claim 6, wherein, in response to a request to change the priorities, the display unit displays a menu to select the common function key from a plurality of function keys, a menu to change priorities for the selected common function key, a priority change result, and a menu to select the application type.

8. The hybrid device according to claim 7, wherein the input unit receives the request to change the priorities of the task-handlers, information regarding the selected common function key, the changed priorities, and the application type, and provides the request to change the priorities and the information to the priority changer.

9. The hybrid device according to claim 8, wherein the common function key is a "PLAY" key, a "RECORD" key, a "STOP" key, a "PAUSE" key, a "FAST FORWARD SCAN" key, or a "REWIND SCAN" key.

10. The hybrid device according to claim 7, wherein the priority changer changes the priorities of task-handlers corresponding to the selected common function key, based on the request to change the priorities, the information regarding the selected common function key, and the changed priorities.

11. The hybrid device according to claim 10, wherein the priority changer implements and changes the priorities of the task-handlers using a linked-list.

12. The hybrid device according to claim 7, wherein the memory stores the information regarding the changed priorities, according to information regarding the selected application type.

13. The hybrid device according to claim 12, wherein the information regarding the selected application type comprises information indicating whether the changed priorities are to be applied once, are to be applied permanently, or are to set to a default setting.

14. The hybrid device according to claim 6, wherein the input unit further comprises a priority change request key that the user uses to transmit the information to change the priorities of the task-handlers.

15. An apparatus to change priorities of task-handlers of a hybrid device, the apparatus comprising:
an input device to input a priority change request from a user, to the hybrid device;
a display to display a function key selection menu comprising function keys selectable by the user, in response to the request, and to display a priority menu comprising specific priorities of a plurality of the task-handlers of the hybrid device that correspond to a common one of the function keys selected by the user from the function key selection menu and are controlled by operation of the selected common function key; and
a priority changer to change the specific priorities of the plurality of task-handlers of the hybrid device controlled by the operation of the selected common function key based on selections made by the user from the priority menu, according to an application type indicating whether the changed priorities of the task-handlers are to be applied once, are to be applied permanently, or are to be set to a default setting,
wherein:
the hybrid device is configured to simultaneously perform a plurality of recording and/or reproducing functions by simultaneously recording data to and/or reproducing data from at least one non-transitory information storage medium;
each of the task-handlers of the hybrid device controlled by the operation of the selected common function key controls a different one of the plurality of recording and/or reproducing functions of the hybrid device; and
the operation of each of the task-handlers of the hybrid device controlled by the operation of the selected common function key is selectively and individually controlled by the operation of the selected common function key, according to the specific priorities of the task-handlers of the hybrid device controlled by the operation of the selected common function key.

16. The apparatus according to claim 15, wherein the function key selection menu comprises a "PLAY" key, or a "RECORD" key, or a "STOP" key, or a "PAUSE" key, or a "FAST FORWARD SCAN" key, or a "REWIND SCAN" key, or any combination thereof.

17. The apparatus according to claim 16, wherein the display displays the priorities of the task-handlers of the hybrid device controlled by the operation of the selected common function key after the priority changer changes the priorities of the task-handlers of the hybrid device controlled by the operation of the selected common function key.

18. The apparatus according to claim 15, wherein the changed priorities of the task-handlers are applied permanently.

19. The apparatus according to claim 15, wherein the changed priorities of the task-handlers are applied once.

20. The apparatus according to claim 15, wherein the changed priorities of the task-handlers are set to the default setting.

21. A method, implemented in a hybrid device, to change priorities of a plurality of task-handlers of the hybrid device corresponding to a common function key, the task-handlers being controlled by operation of the common function key, the method comprising:

receiving a request to change priorities of the task-handlers from an input unit by a user to the hybrid device; and changing priorities of the task-handlers in the hybrid device, based on the received information, according to an application type indicating whether the changed priorities of the task-handlers are to be applied once, are to be applied permanently, or are to be set to a default setting, wherein:

the hybrid device is configured to simultaneously perform a plurality of recording and/or reproducing functions by simultaneously recording data to and/or reproducing data from at least one non-transitory information storage medium;

each of the task-handlers of the hybrid device controlled by the operation of the common function key controls a different one of the plurality of recording and/or reproducing functions of the hybrid device; and the operation of each of the task-handlers of the hybrid device is selectively and individually controlled by the operation of the common function key, according to the priorities of the task-handlers.

22. A non-transitory computer-readable recording medium having recorded thereon a program for controlling a computer to change priorities of a plurality of task-handlers of a hybrid device, the task-handlers of the hybrid device corresponding to a common function key of an input unit and being controlled by operation of the common function key of the input unit, the program comprising:

receiving from the input unit a request from a user to change priorities of the task-handlers; and changing priorities of the task-handlers, based on the received information, according to an application type indicating whether the changed priorities of the task-handlers are to be applied once, are to be applied permanently, or are to be set to a default setting, wherein:

the hybrid device is configured to simultaneously perform a plurality of recording and/or reproducing functions by simultaneously recording data to and/or reproducing data from at least one non-transitory information storage medium;

each of the task-handlers of the hybrid device controlled by the operation of the common function key controls a different one of the plurality of recording and/or reproducing functions of the hybrid device; and the operation of each of the task-handlers of the hybrid device is selectively and individually controlled by the operation of the common function key, according to the priorities of the task-handlers.

* * * * *